US012378087B2

(12) United States Patent
Loesch et al.

(10) Patent No.: US 12,378,087 B2
(45) Date of Patent: Aug. 5, 2025

(54) LOADING LOCKOUT SYSTEM

(71) Applicant: INDUSTRIAL PROCESS SYSTEMS, INC., Louisville, KY (US)

(72) Inventors: Leonard A. Loesch, Naples, FL (US); Sherman Owen, Louisville, KY (US); Luis J. Tello, Louisville, KY (US)

(73) Assignee: INDUSTRIAL PROCESS SYSTEMS, INC., Louisville, KY (US)

( * ) Notice: Subject to any disclaimer, the term of this patent is extended or adjusted under 35 U.S.C. 154(b) by 0 days.

(21) Appl. No.: 18/736,533

(22) Filed: Jun. 7, 2024

(65) Prior Publication Data

US 2024/0317515 A1 Sep. 26, 2024

Related U.S. Application Data

(63) Continuation-in-part of application No. 18/601,997, filed on Mar. 11, 2024.

(60) Provisional application No. 63/604,539, filed on Nov. 30, 2023, provisional application No. 63/489,465, filed on Mar. 10, 2023.

(51) Int. Cl.
*B65G 69/00* (2006.01)
*B65G 67/04* (2006.01)
*G01S 17/89* (2020.01)
*G06T 7/00* (2017.01)
*G06T 7/62* (2017.01)
*G06V 20/52* (2022.01)
*G06V 20/64* (2022.01)

(52) U.S. Cl.
CPC ........... *B65G 69/006* (2013.01); *B65G 67/04* (2013.01); *G01S 17/89* (2013.01); *G06T 7/0008* (2013.01); *G06T 7/62* (2017.01); *G06V 20/52* (2022.01); *G06V 20/64* (2022.01); *G06T 2207/20081* (2013.01); *G06V 2201/06* (2022.01); *G06V 2201/08* (2022.01)

(58) Field of Classification Search
CPC ................. B65G 69/006; B65G 67/04; B65G 2203/0283; B65G 2203/041; G01S 17/89; G06T 7/0008; G06T 7/62; G06T 2207/20081; G06V 20/52; G06V 20/64; G06V 2201/06; G06V 2201/08
See application file for complete search history.

(56) References Cited

U.S. PATENT DOCUMENTS

2021/0045292 A1* 2/2021 Babler ................ A01D 89/008
2022/0333344 A1* 10/2022 Kean ....................... E02F 3/434
2024/0233171 A1* 7/2024 Sauer ......................... G06T 7/73

OTHER PUBLICATIONS

Liu et al, ("Grain Truck Loading Status Detection Based on Machine Vision", 2019 IEEE 4th International Conference on Image, Vision and Computing, pp. 40-44) (Year: 2019).*

* cited by examiner

*Primary Examiner* — Amara Abdi
(74) *Attorney, Agent, or Firm* — Duncan Galloway Greenwald PLLC; Kevin T. Duncan

(57) ABSTRACT

A loading lockout system which takes an image of a vessel, recognizes the receiving opening of the vessel, and prevents the loading of material into the vessel until it determines that the discharge footprint of the material storage device is within the receiving opening of the vessel.

13 Claims, 13 Drawing Sheets

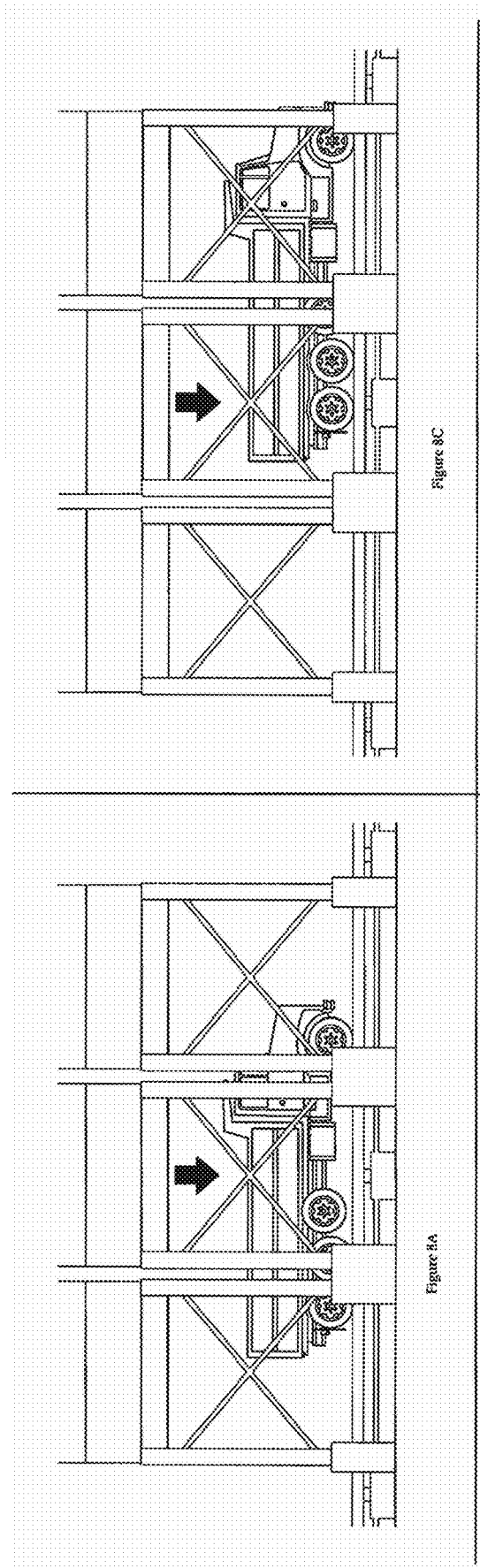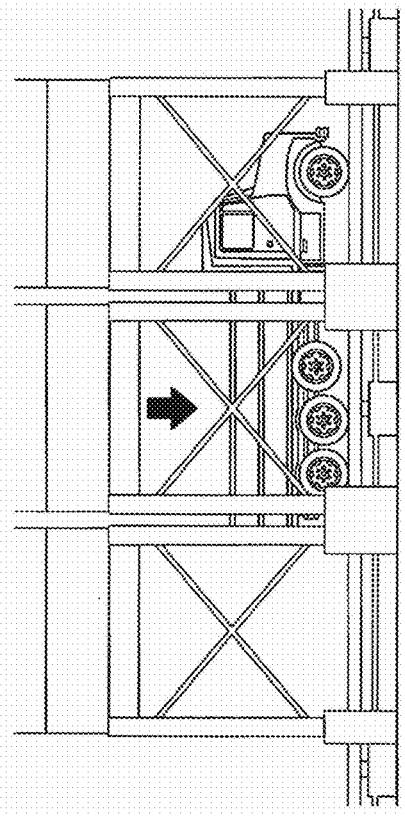

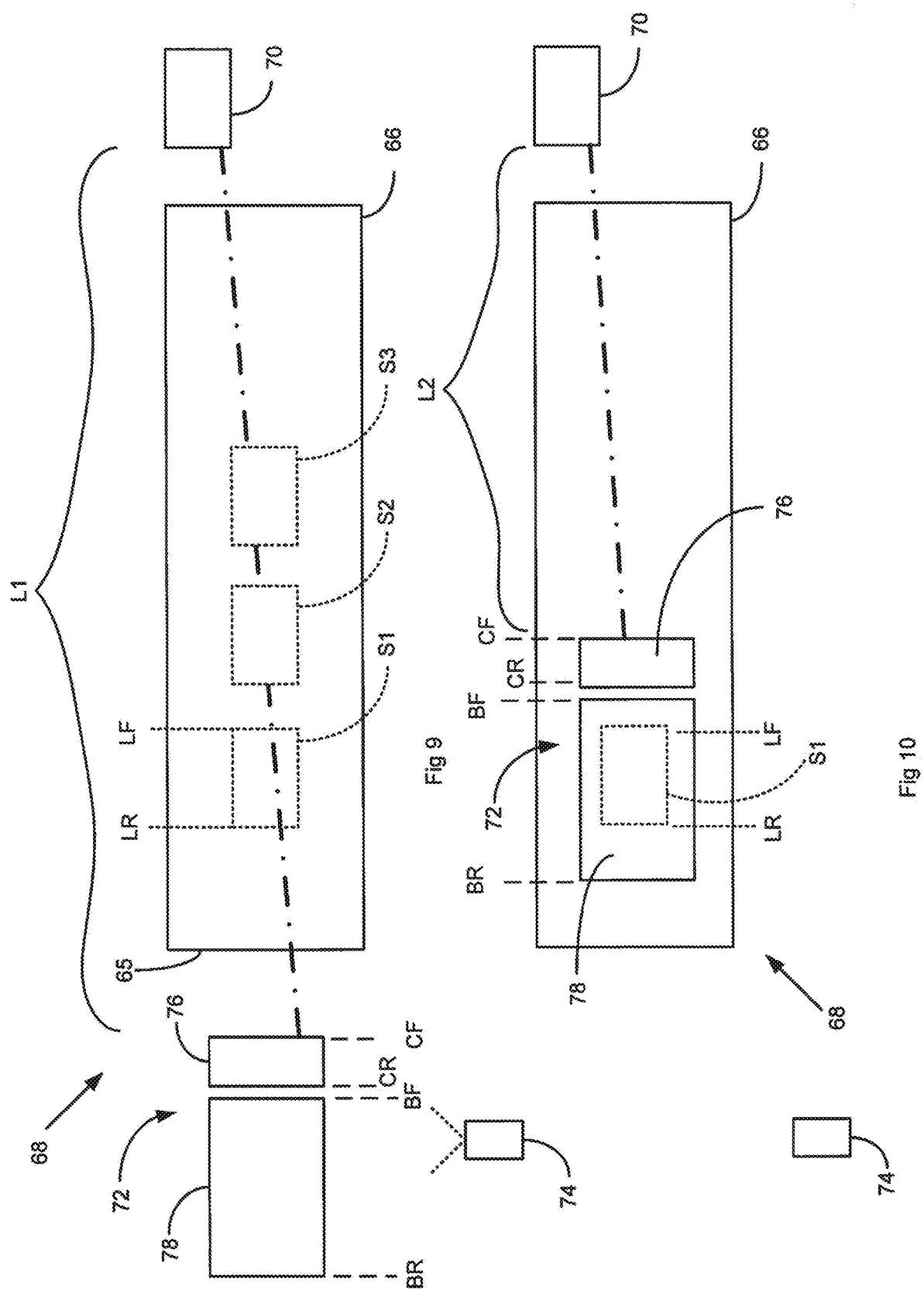

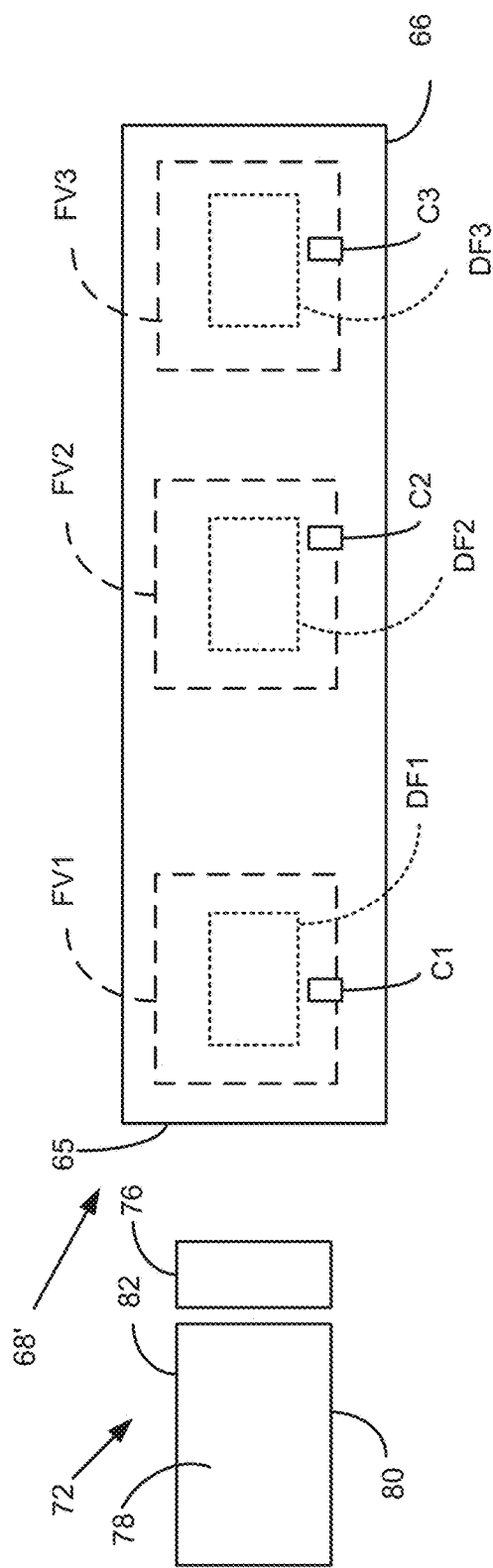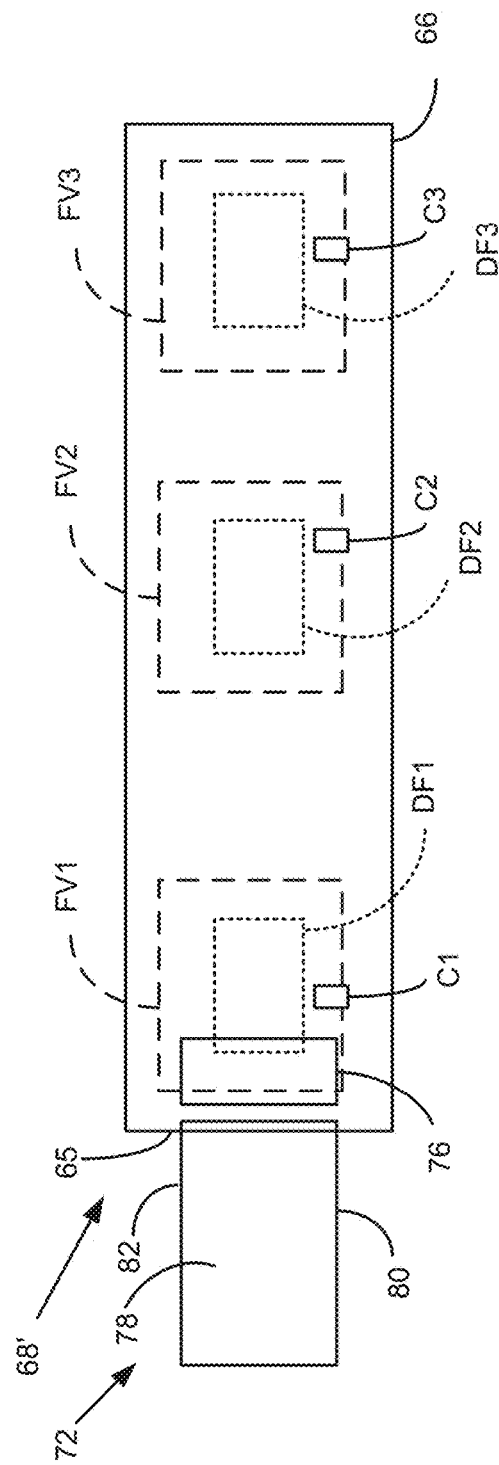
Fig 11
Fig 12

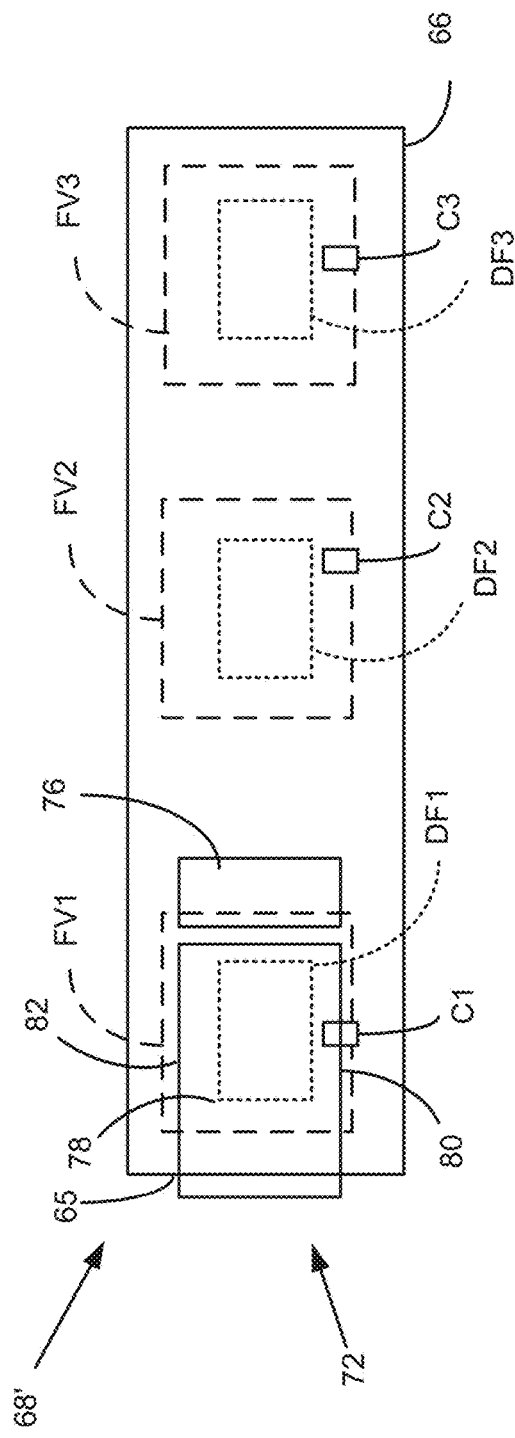
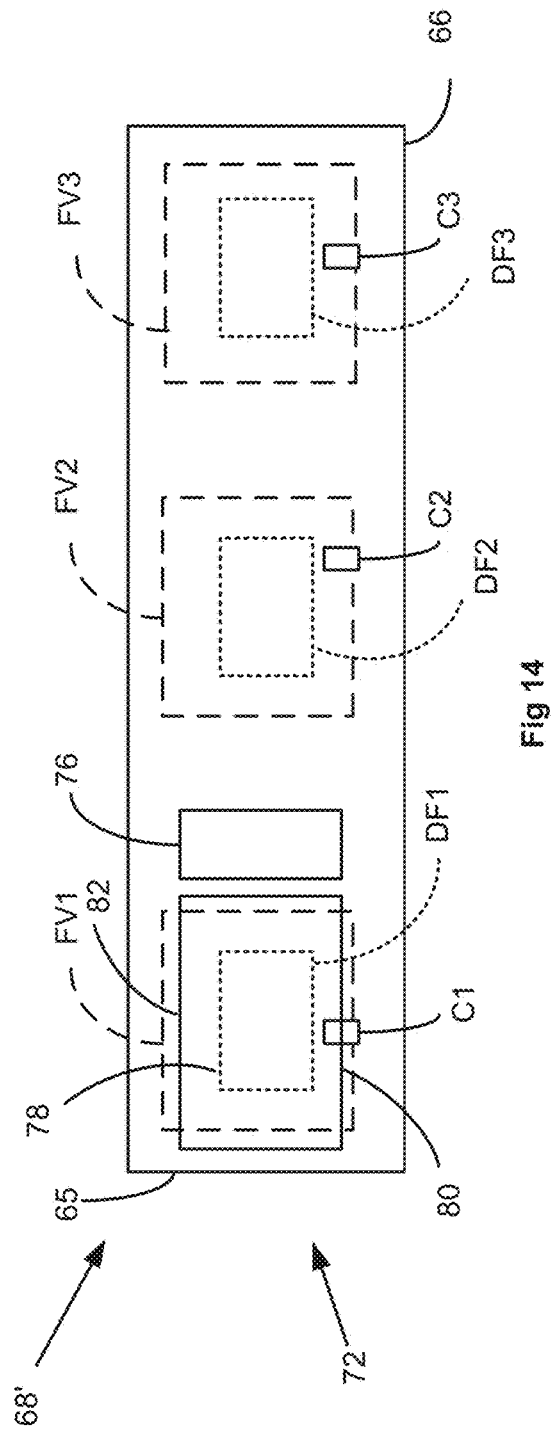

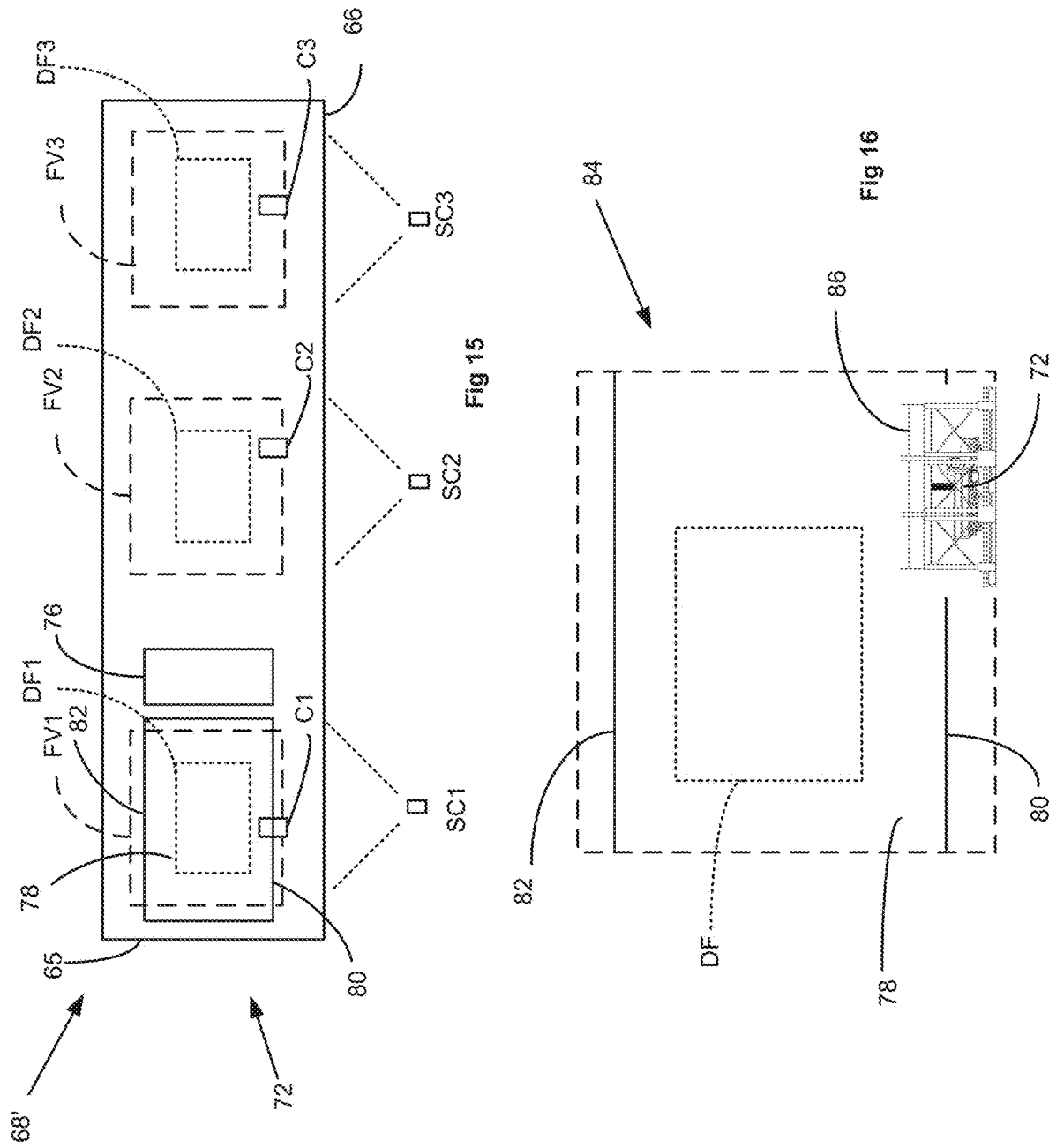

LOADING LOCKOUT SYSTEM

CROSS-REFERENCE TO RELATED APPLICATIONS AND INCORPORATION BY REFERENCE

This application is a continuation-in-part, and claims priority from U.S. Ser. No. 18/601,997, filed Mar. 11, 2024, which claims priority from U.S. Ser. No. 63/489,465, filed Mar. 10, 2023, and from U.S. Ser. No. 63/604,539, filed Nov. 30, 2023, all of which are hereby incorporated herein by reference in the entirety.

BACKGROUND

The present invention relates to a loading system. More particularly, it relates to a loading system which helps ensure that the material being loaded is released only into the desired portion of the receiving vessel, such as the open bed of a truck.

In the asphalt industry, as well as in other applications of handling material such as grain, coal, and so forth, a truck is driven under a silo containing material to be loaded into the bed of the truck, and then a procedure is followed to load the truck bed from the silo. The procedure of loading the truck bed from the silo is called a loadout procedure. An overhead loading gate (also referred to as a loading gate, discharge gate, or dump gate) is opened, and the material, such as asphalt, is allowed to fall into the open bed of the truck. The area directly below the loading gate, through which the material falls when the loading gate is opened, is referred to as the discharge footprint. This loadout procedure typically is controlled by a standard loadout system, which allows a specific amount of material, typically determined by weight, to be loaded from the storage silo onto the bed of the truck.

The standard loadout system usually includes a scale at ground level underneath the silo, and the truck is driven onto the scale, where a tare weight, i.e., the weight of an empty vehicle or payload or load area or container, is measured before loading begins. Weight also is measured as the truck is being loaded, in order to determine when the appropriate amount of material has been loaded, and the loading gate is then closed. The plant operator actuates a control to start and stop the loading process and may interrupt the process manually in the event of a problem or otherwise.

Often, the plant operator is very busy and can be distracted by the many functions he must perform, so he sometimes makes a mistake and initiates a loadout procedure from an overhead loading gate, of either a correct silo or an incorrect silo, even though the open truck bed is not properly located under the silo, and an improper item, such as the truck cab, is located under the overhead loading gate instead. This may result in a loadout that drops a load of material onto the cab of the truck or other improper item or other unintended location, causing damage and waste and potentially resulting in injury to a person in the area of the loadout. This disrupts the entire operation and causes much delay and expense and other unintended and undesired consequences.

Other improper items that may be under the loading gate (within the discharge footprint) may include a person, another piece of equipment, or a tarp covering the truck bed. It is desirable to prevent the opening of the loading gate when any improper item is in within the discharge footprint and to ensure that the discharge footprint is within the receiving opening of the truck bed or other receiving vessel before allowing the loading gate to be opened.

Similar loading procedures are used for loading barges, railroad cars, and other vessels, and the present invention may be adapted for use in those situations as well.

In the embodiments described here, the receiving opening is aligned with the body of the truck bed, but there also may be situations in which the receiving opening is offset from the body of the vessel that receives the material, such as when the receiving opening is a loading chute that is offset from the main body of the vessel. It also is understood that the discharge footprint is the path that extends from the discharge opening of the material storage device downwardly to define the path through which the material falls by gravity when the discharge opening is opened. When we say that the discharge footprint is within the receiving opening, we mean that the discharge opening is properly aligned with the receiving opening so that, when the discharge opening is opened, the material will flow downwardly by gravity along the path of the discharge footprint, through the receiving opening and into the vessel. The discharge footprint is not considered to be within the receiving opening if it is located such that a substantial amount of material will spill out instead of entering the receiving opening.

SUMMARY

An embodiment of the present invention interfaces with the standard loadout system to provide a loading lockout arrangement which identifies the receiving opening of the receiving vessel to be loaded, such as the open truck bed, and determines whether that receiving opening is within the required location for a satisfactory loadout procedure to occur. If the receiving opening is not properly located under the loading gate, or if another unsatisfactory situation is detected, such as improper items located under the loading gate, e.g., of a silo (which includes the correct and intended silo and even an incorrect silo, or the tailgate, e.g., detection of the position of the vehicle tailgate, not being closed or locked or secured in proper position for receiving a load of material), this loading arrangement prevents the standard system from opening the loading gate.

A computer system is trained to recognize the receiving opening of the vessel to be loaded as well as a predefined set of improper things that might be found in the loading area using YOLO (You Only Look Once) or similar known technology. Numerous images are provided to the system, with the desired elements, such as the receiving opening of the open truck bed, the cab of the truck, hard hats, etc., being identified in the images presented to the system, to teach the system to identify those elements. Throughout use of the system, additional images, inputs, and other datapoints may be collected and input or introduced into a training module or system or alternative intelligence (AI) type system to provide feedback and to help improve the system performance. For instance, recognition may be fine tuned by capturing images of trucks and cabs and truck beds and other physical features to help identify features in real time as trucks or other vehicles are driven into a loading area to facilitate the loading operation. In particular, if the system is not able to identify the receiving opening of any vessel that is placed in the loading area such that the operator has to override the lockout system in order to load the vessel, the system will log that event, store the images involved in that event, and identify those images to be used for future training.

Feedback may be given to a driver or operator of the vessel to confirm the vessel is in a "permissive" state or a "lockout" state. If in a permissive state, then the system has determined the vessel is in a condition to receive a payload of materials and if not then to lock out the system to prevent the loading system from dispensing or delivering payload materials from the dispensing or delivery system.

The present invention provides a "Look, Lock'n Load System" that is a breakthrough method to safely load trucks or other vessels and avoid the often-present danger of dropping loads from the silo onto the cab of the truck or inappropriate loadout positions, and prevent opening the wrong silo gates.

For example, the design configuration and method of operation is by using AI (Artificial Intelligence) to visually and digitally scan real-world images of trucks or other vessels to teach the system to recognize and differentiate between the receiving opening of the vessel and other portions of the vessel (such as the cab of the truck) that should not be within the discharge footprint when the loading gate is opened.

The training system that has been used in this example is referred to as "YOLO" (You Only Look Once). The control system also learns or is programmed to recognize or to ignore items such as silo structural supports. The system may be inherently familiar with the loading areas in which vessels are received for loading. In addition to the clear live loadout monitor, a console may be provided that allows manual load and override of the Look, Lock'n Load System and has a keylock which requires the use of a key in order to bypass the lockout system.

Other kinds of images may be presented to the system to teach it to recognize other improper objects that should not be within the discharge footprint during loading, such as images of hardhats, human faces, front end loaders, or other items commonly located in a plant yard.

In one embodiment, a camera takes or retrieves or grabs an image of the vessel, e.g., truck, or a portion of the vessel under the silo into which material is desired to be loaded. The image is sent to the computer, which analyzes the image based on its previous training to recognize, with at least a specified probability of certainty, the receiving opening of the vessel (i.e., the open truck bed). The computer also may recognize other objects, such as the truck cab, hard hats, people, other pieces of equipment, etc. that should not be within the discharge footprint when the vessel is being loaded.

The image also may be used by the computer to make a measurement of the vessel, such as by correlating the number of pixels in the image with a certain dimension of recognized portions of the vessel.

The computer locks out the loading sequence from the existing loading system until it finds that the proper circumstances exist. For example, it checks to ensure that the truck cab or other pre-defined improper item is not located within the discharge footprint. This check may include ensuring that there is no tarp over the truck bed and ensuring that the tailgate is closed. If those conditions are met, the computer energizes a protection relay for that overhead loading gate. In order for the existing loadout system to be able to open the loading gate, both the protection relay and a second relay, referred to here as the permissive relay, must be activated.

The computer also uses an algorithm to determine whether the open truck bed (or other receiving opening) is properly located under the loading gate to be activated (i.e. to determine whether the discharge footprint is within the receiving opening of the vessel). If that condition is satisfied, the computer sends a signal which energizes the permissive relay for the lockout system for that overhead loading gate. With both the protective relay and permissive relay being activated, or otherwise in an operational allowance state or condition, the existing loadout control system can proceed with its loadout sequence.

An alternative embodiment of the present invention also interfaces with the standard loadout system to provide a loading lockout arrangement, but it uses a contactless distance measuring system, such as LiDAR (Light Detection And Ranging) in conjunction with the use of a camera, to determine the position of the open truck bed (or other receiving opening of a vessel). This arrangement can work in most known environments but is especially suited for confined, semi-enclosed areas, such as may be found in a loadout system inside a blue-smoke recovery tunnel.

In this second embodiment, as the truck approaches the loading area, and before it enters the confined space, a photo is taken by a camera, and the image is sent to a computer which analyzes the image to identify the cab and the bed of the truck and measure their dimensions. In this embodiment, the dimensions are measured by counting the number of pixels in the image and equating these to a pre-calibrated number of pixels per unit of length (such as the number of pixels per meter). Other known measurement methods could be used instead.

Once the truck is stopped under the selected loadout silo, algorithms are applied, in combination with the LiDAR measured distance of the actual location of the front of the truck, to ensure that the cab of the truck is outside of the discharge footprint to enable the activation of a protective relay. Similar algorithms are likewise applied to ensure that the discharge footprint is within the receiving opening of the bed of the truck to enable the activation of a second, permissive relay to finally allow the loadout sequence to proceed.

In a further exemplary embodiment, the arrangement provides a loading lockout system defining a discharge footprint. The loading lockout system comprising: a system which takes an image of a vessel and determines the position of the receiving opening of the vessel relative to the discharge footprint; said system also looking for any predefined improper items that should not be in the discharge footprint during loading; said system activating a protective relay upon determining that no predefined improper items are within the discharge footprint; and said system activating a permissive relay upon determining that the discharge footprint is within the receiving opening of the vessel.

BRIEF DESCRIPTION OF THE DRAWINGS

FIGS. 8A-8C are a set of schematic representations illustrating a progressive loading of a receiving truck with arrows indicating the gravity discharge of the material, e.g., hotmix, as it would be seen discharging into the truck in accordance with the loading system;

FIG. 9 is a schematic plan view of a second embodiment of a loading lockout system which is particularly suited for a semi-enclosed environment, such as in a blue-smoke recovery system;

FIG. 10 is a schematic plan view of the embodiment of FIG. 9, showing the vessel to be loaded as it has entered the loadout tunnel in preparation for receiving material from a material storage devices or silo;

FIG. 11 is a schematic plan view of another embodiment of a loading lockout system which utilizes a downwardly-aimed camera to monitor the discharge footprint of a material storage device;

FIG. 12 is a schematic plan view similar to that of FIG. 11 but showing a vessel, in this instance a truck having a cab and a receiving opening, moving forward into the material loading area, wherein a portion of the cab of the vessel is registering in the field of view of the first camera;

FIG. 13 is a schematic plan view similar to that of FIG. 12, but showing a vessel moving further forward into the material loading area, wherein a portion of the cab is still registering in the field of view of the first camera, and the discharge footprint is within the receiving opening of the vessel;

FIG. 14 is a schematic plan view similar to that of FIG. 13 but showing a vessel moving further forward into the material loading area, wherein no portion of the cab of the vessel is registering in the field of view of the first camera and the discharge footprint is within the receiving opening of the vessel;

FIG. 15 is a schematic plan view similar to that of FIG. 14 but showing additional cameras, these cameras aimed horizontally at the material loading area for imaging a side view of the vessel as it gets loaded with material from one of the material storage devices; and FIG. 16 is a schematic view of a display screen showing the field of view of the downwardly-aimed camera, showing the receiving opening of the vessel and the discharge footprint (in small dotted lines) of one of the material storage devices and also showing an inset image (or video) of the side view of the vessel, as taken by the horizontally-aimed camera during the loadout procedure.

DETAILED DESCRIPTION

Figure 1:
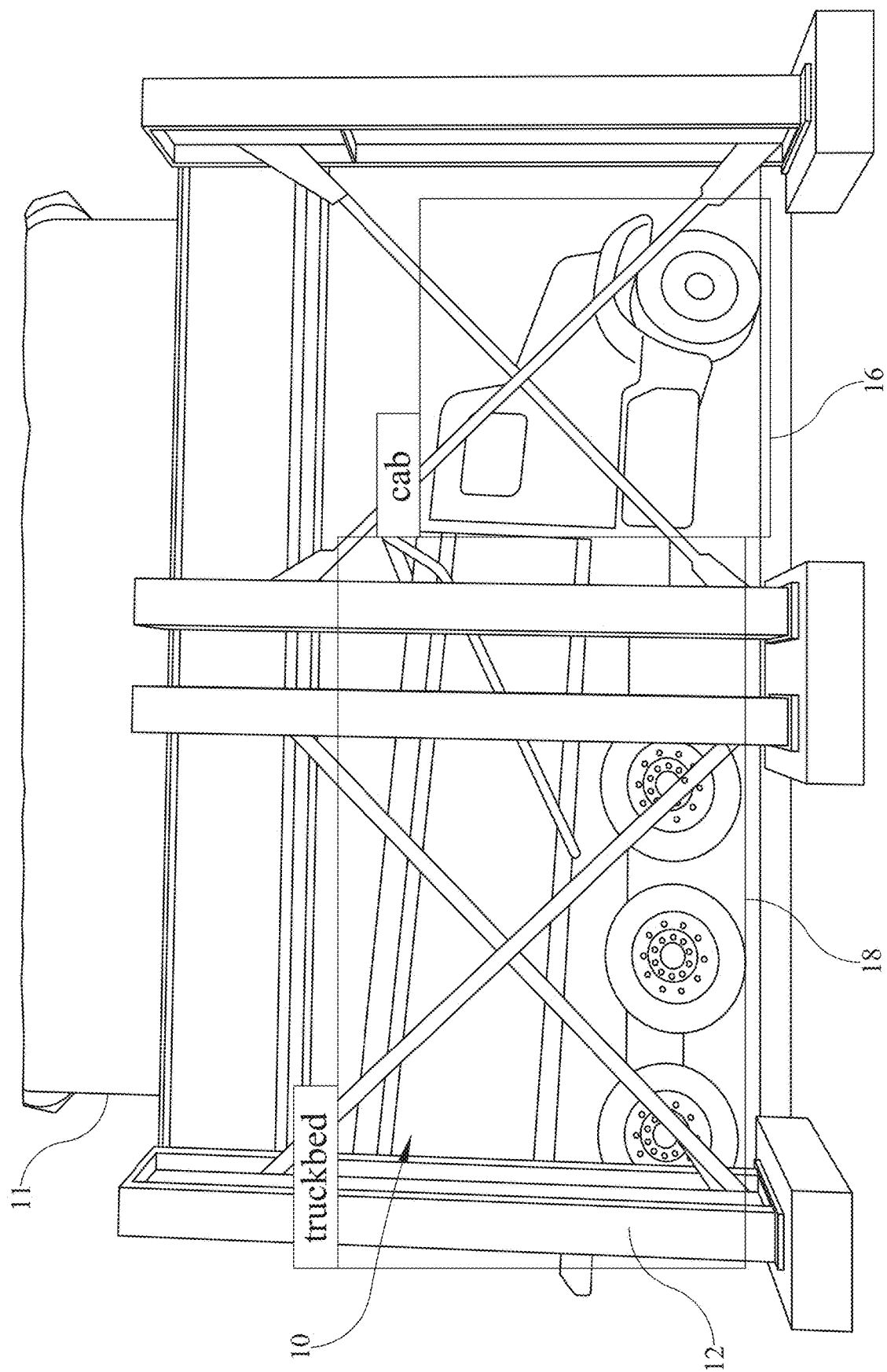
FIG. 1 is a drawing of a truck with a cab and a bed as identified by the loading system.

FIG. 1 is a photograph of a vessel, in this case a truck 10 that has been driven underneath a tank 11 supported on a support structure 12. Here, the tank 11 represents a silo or other material storage device holding material for delivery into the receiving opening of a bin or trailer or truck bed. In this example, the truck 10 is resting on a scale, which weighs the truck 10 before loading (tare weight) and during loading. In one example of a display or a monitor associated with the system, the computer of the present loading lockout system identifies the cab 16 and the receiving opening (open bed) 18 of the truck 10 and displays or indicates the location of the cab 16 with a red rectangle and the location of the receiving opening (open bed) 18 with a green rectangle, despite the fact that the image of the truck 10 is partially hidden from the camera (not shown in this view) by the structure 12. The process for identifying the cab and bed will be described later.

It should be noted that, in this situation, there is no concern that the truck bed 18 might not be properly aligned with the discharge opening in the side-to-side direction, because the driver has to keep the truck within a narrow path when driving into the loading area. That narrow path ensures that the truck bed 18 will be properly aligned in the side-to-side direction, so the only concern is whether it is properly aligned in the front-to-back direction.

Figure 2:
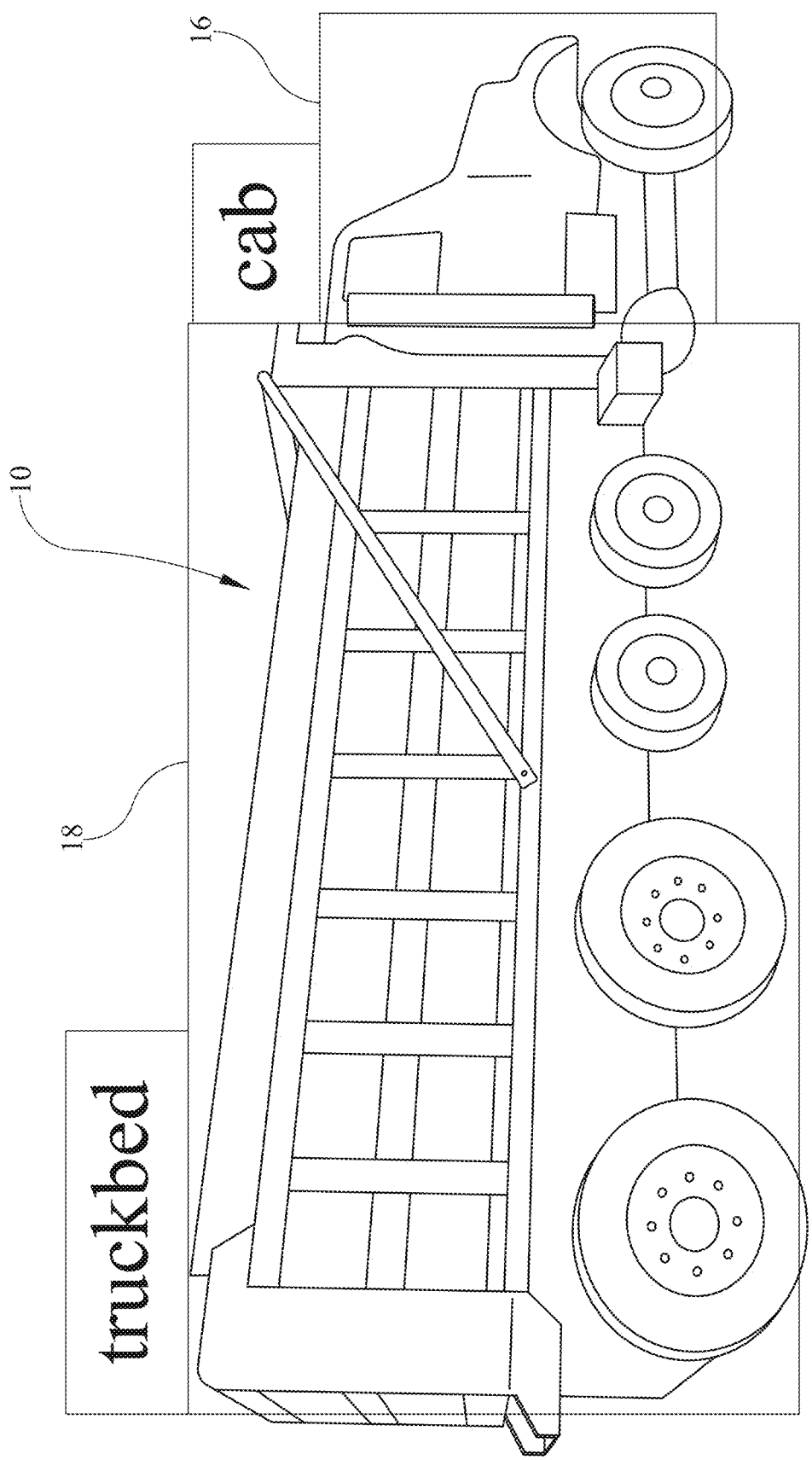
FIG. 2 is a drawing of another truck with a cab and a bed as identified by the loading system.
Figure 3:
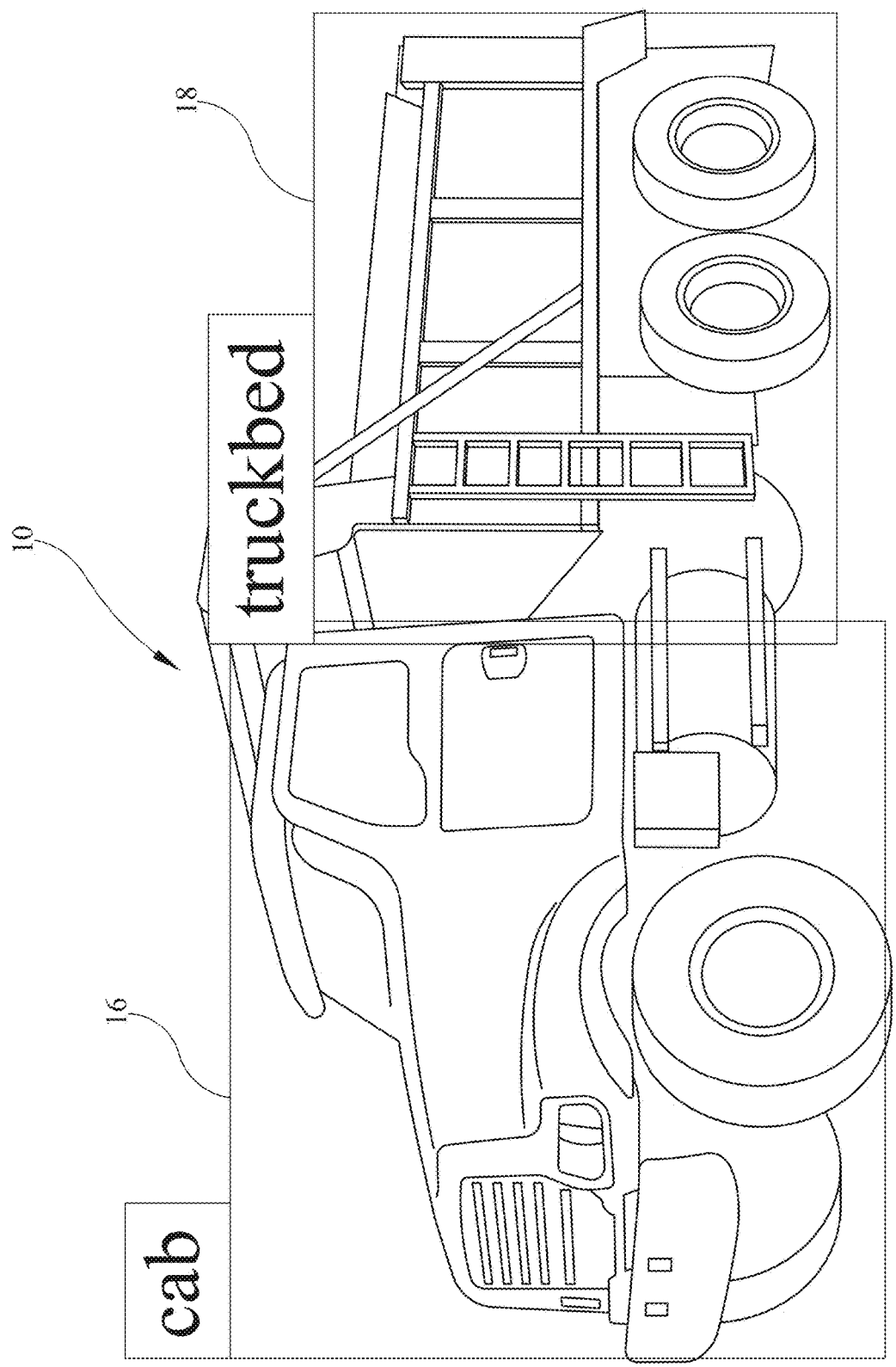
FIG. 3 is a drawing of another truck with a cab and a bed as identified by the loading system.

FIGS. 2 and 3 are drawings of different types of trucks 10, wherein the loading lockout arrangement 14 (See FIG. 4) identifies the cab 16 and the bed 18 of each of the trucks, despite these trucks being totally different models of trucks 10.

Figure 4:
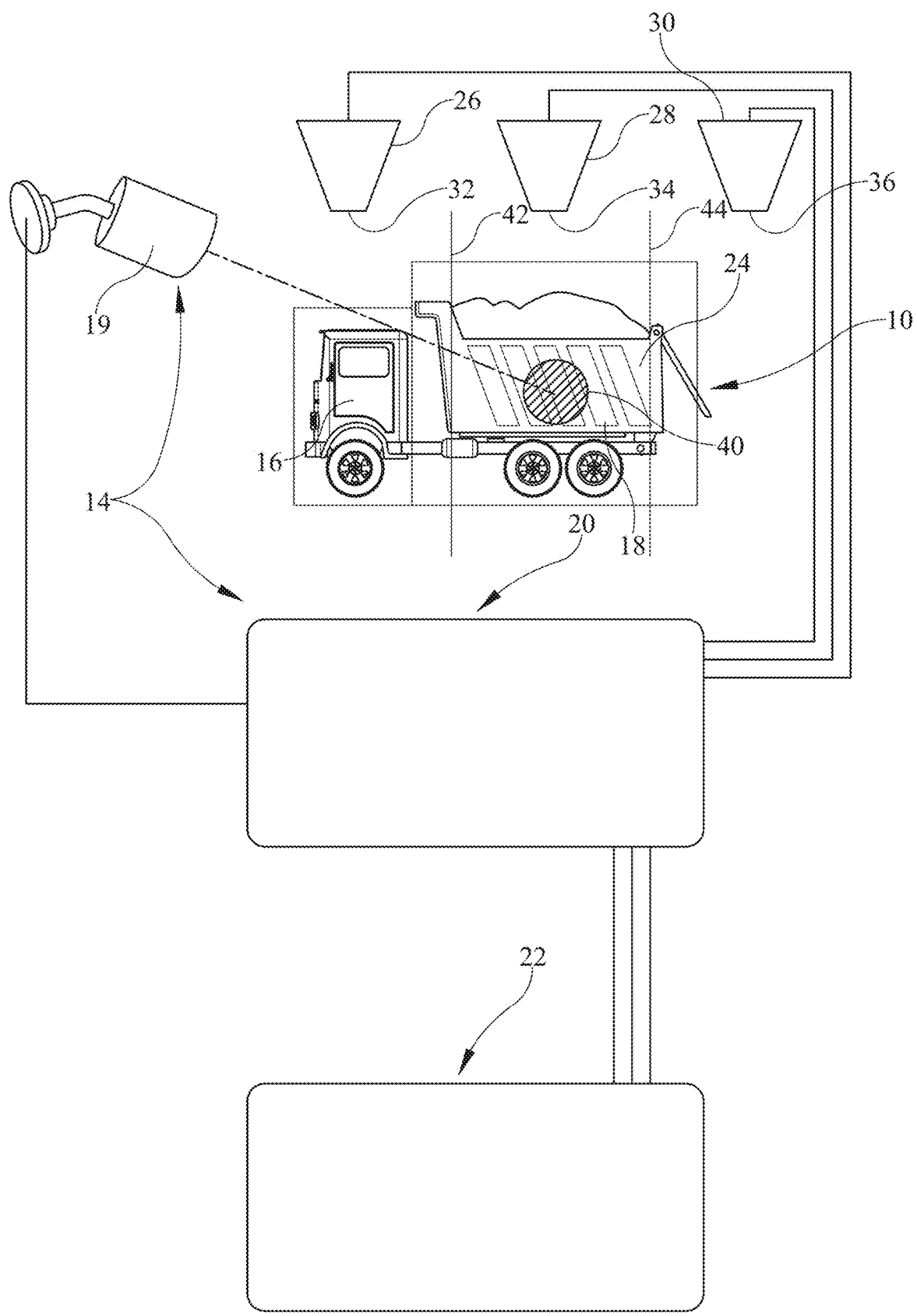
FIG. 4 is a schematic view of a first embodiment of the loading lockout system showing how the system interfaces with the plant's loadout system and showing a reticle system (such as a bullseye) superimposed on the image of a truck.

FIG. 4 is a schematic view of an embodiment of the present loading lockout system 14. This basic form of the system includes a camera 19 connected to a computer vision system 20, which interfaces with the plant's existing loadout system 22. This particular example has three silos 26, 28, 30. Each of the silos 26, 28, 30 has an overhead loading gate 32, 34, 36, respectively, which, when actuated, allows material 24 to fall from the discharge opening of the corresponding silo 26, 28, 30. In this example, the operator wants to load material from the middle silo 28 into the open truck bed 18.

When the operator activates the existing loadout system 22 to load from the middle silo 28, the system 14 interrupts the signal from the existing loadout system 22 and prevents the loading gate from being opened until the proper conditions are met.

The camera 19 captures an image of the truck 10 and transmits it to a computer 38 (See FIG. 6), which, based on its previous training, as described earlier, identifies the vehicle 10 and the location of the cab 16 and bed 18 relative to the overhead loading gate 34 of the middle silo 28. The identification algorithm includes a percent probability of correct identification. If the probability is within acceptable ranges (so far it has been found that a 50% probability results in a reliably correct identification), the system determines whether the cab 16 is under the silo 28 and whether the bed 18 is properly located under the silo 28. The system also may to check to ensure that other predetermined improper items, such as hard hats, loaders, etc. that should not be in the discharge footprint during the loading procedure, are not in area of the discharge footprint. Once it is determined that the cab 16 and possibly other predetermined improper items are not under the discharge opening of the silo 28 and the open bed 18 is properly located under the silo 28, the loading system 14 enables electrical signals (as discussed in more detail later) to be transmitted to allow the existing system 22 to open the overhead loading gate 34 so as to unload (initiate the loadout sequence) from the discharge opening of the storage silo 28 and into the open bed 18 of the truck 10.

The computer 38 (See FIG. 6) transmits the image of the identified truck 10 onto a screen that can be viewed by the operator and generates a red box display around the cab and a green box display around the open truck bed 18. It also generates virtual crosshairs (also referred to as a reticle 40, See FIG. 4), indicating where the silo will drop its load when its loading gate 34 is opened. (This roughly corresponds to the discharge footprint.) The red and green boxes and the crosshairs or reticle 40 are superimposed on the displayed image of the truck 10. The computer also generates vertical decision lines 42, 44 located a safe distance within the forward and aft positions, respectively, of the open truck bed 18. If the crosshairs or reticle 40 of the overhead loading gate 34 is inside the space between the vertical decision lines 42, 44 (i.e. if the discharge footprint is within the receiving opening of the vessel), the computer determines that it is acceptable for the overhead loading gate 34 to be actuated (provided all other conditions are met, as explained in more detail later).

It should be noted that, typically, this loading lockout system 14 does not initiate the loadout procedure; it only gives the go/no-go decision for the loadout procedure to be carried out if requested by the operator or by the plant's loadout system 22. This loading lockout system 14 is thus designed to interface with the plant's existing loadout system 22.

The computer 38 of this loading lockout system 14 also has been trained to recognize images of a person, hard hat, head, tractor cab, loader cab, skid steer and other improper items that should not be within the discharge footprint during the loading procedure. The system checks to see whether any of those predetermined improper items are identified within the "reticle zone" (within the discharge footprint), the zone in which the silo will dump its load. The computer 38 shuts down the unloading procedure by interrupting the opening signal from the standard loading system 22 until it determines that none of the predetermined improper items are within the discharge footprint. This prevents the targeted overhead loading gate 34 from opening. (The loading gate 34 will be in the closed position any time it does not receive the opening signal from the loading system 22.)

Note, the opening signal from the standard loading system 22 typically is an electrical signal, but it could be other known types of signals, such a pneumatic, hydraulic, magnetic, or other signal. In any case, the present loading lockout system 14 would interrupt the existing signal until the proper conditions are met.

The computer 38 of the loading lockout system 14 can "erase" or ignore certain structures such as the support structure 12 of the storage silos (see FIG. 1), which may otherwise interfere with the identification of the truck 10 and other items. The camera captures pictures of the truck 10, the driver, and any identifying numbers or other indicia on the truck 12 (such as the DOT number, for instance) to enable a positive identification of the truck 10. The loading lockout system 14 can then interface with the plant's loadout system 22 to permit recording of information such as the identity of the truck being loaded, time of arrival, time of departure (time stamp so that the truck can be correlated to a load transaction), tare weight, weight of material(s) loaded, and even how the truck 10 was loaded (that is, one dump of material or staged dumping, some in the front of the bed 18, some in the rear of the bed 18 and some in the middle of the bed 18) to ensure even loading of the material 24 in the bed 18. The arrangement can be further enhanced to provide output signals that give feedback to the truck driver, advising him to drive forward, stop, drive backwards, ensure the tarp (not shown) is retracted, ensure the tailgate (not shown) is securely locked, and advise to extend the tarp when the loadout procedure is complete so the driver may depart. Some types of output from the system 14 could include a series of colored lights visible to the driver from the cab 16, or a CB radio announcing system, or even a signal transmitted to the driver's smart phone (not shown).

The system also can provide for capturing the temperature of each load. This may be done by taking a thermal camera image of the load to give the load temperature and transmitting this info to be included with the data recorded for the load transaction.

As alluded to above, the loading lockout system 14 also can identify other features of the truck 10. For instance, it identifies whether the truck 10 has a tarp covering the bed 18. If so, the loading lockout system 14 will provide an output indicating that the tarp must be stowed before loading can begin. The computer 38 also may be programmed to require the tarp to be placed over the truck bed 18 before the loading sequence is completed and the truck departs. Another feature that can be identified is whether the tailgate has been closed before allowing the loadout sequence to begin. This can save a lot of time and wasted material.

The loading lockout system 14 can use a single fixed camera 19, a movable camera (not shown), or it may use several cameras (not shown) which may be especially useful if the loadout area is in a confined space, like in a tunnel, such that a single camera 19 cannot be located far enough back to see the whole picture. The computer 38 checks against a reference framework to ensure that the camera 19 is in the correct location relative to the overhead loading gates 32, 24, 26. This use of a reference framework is especially useful in the case of a movable camera or in case a stationary camera is accidentally jostled or otherwise moved. The reference framework allows the computer 38 to know the location of the camera 19 relative to the reference framework and relative to the overhead loading gates. In the case shown in FIG. 1, the reference framework may be the support structure 12.

The loading lockout system 14 may be used in a variety of applications. For example, it may be used to load concrete, asphalt, aggregate, fertilizer, grain, oil, coal, and many other items onto trucks, railroad cars, and even into the holds of ships. It also may be used in applications unloading material from bottom-discharge-railroad-hopper cars dumping coal or grain from the hopper car onto an underground materials handling system. Other applications will be obvious to those skilled in the art.

Figure 5A:
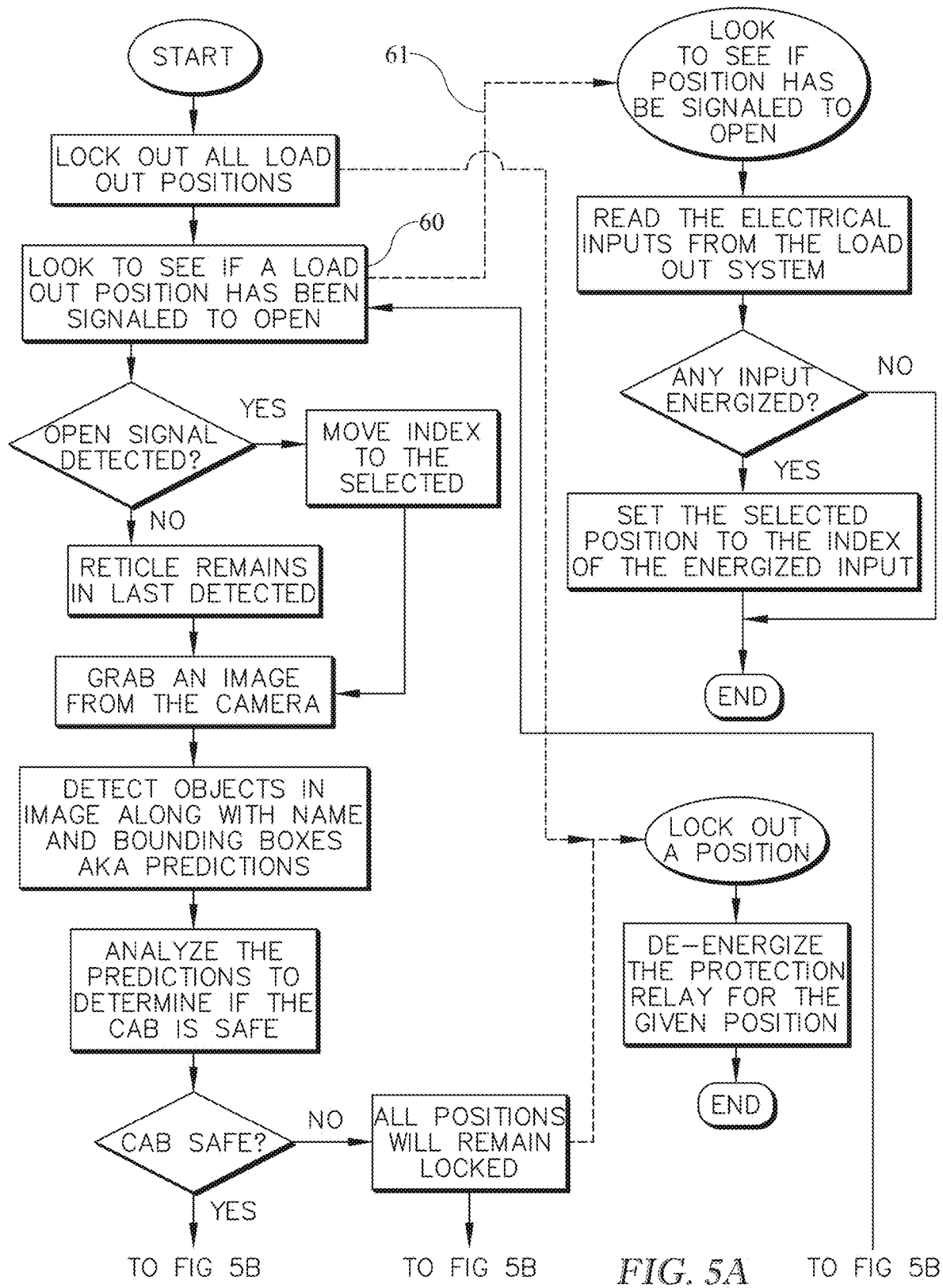
FIG. 5 is a flow chart of the first embodiment of the loading lockout system.
Figure 5B:
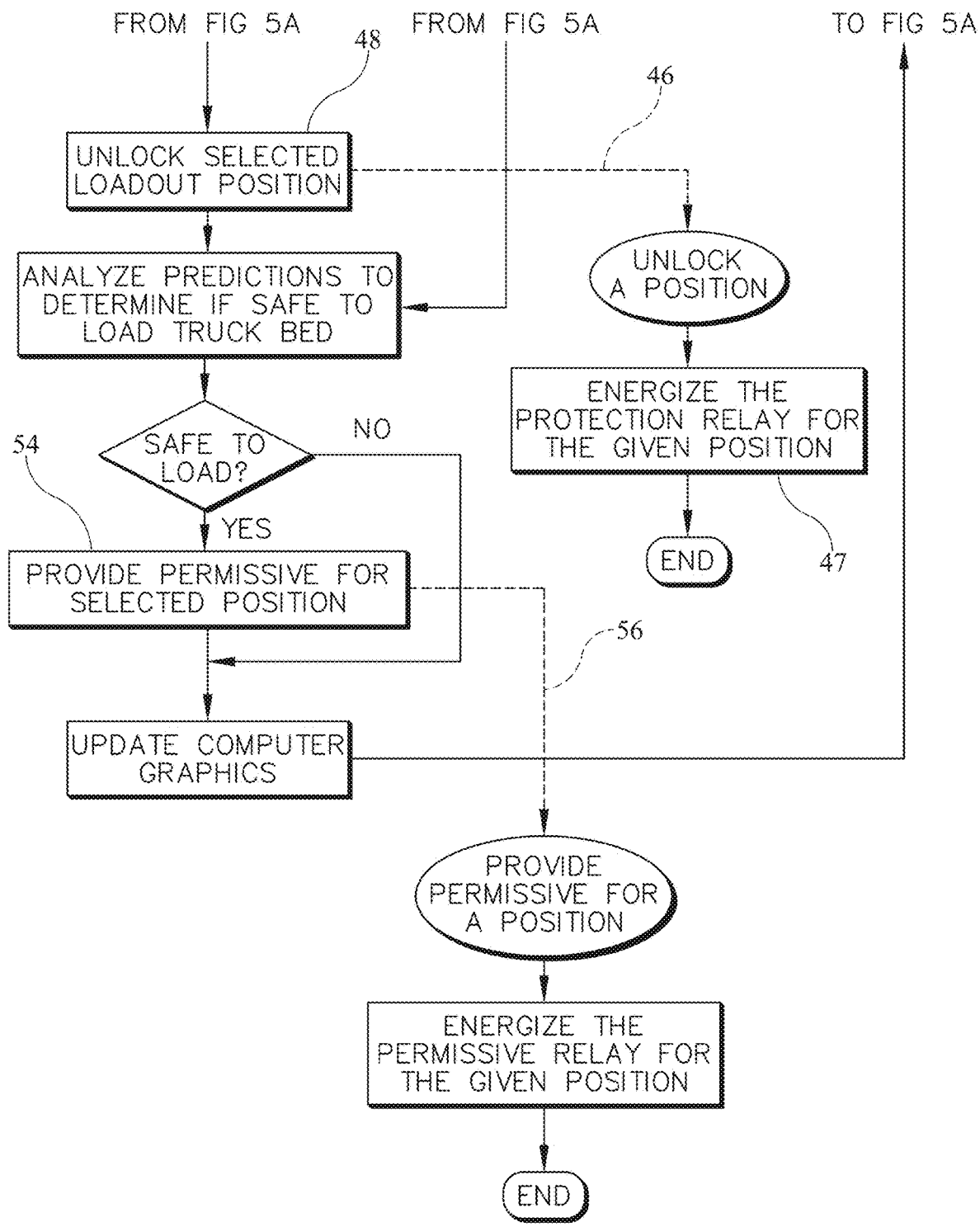

FIG. 5 is a flowchart for the loading lockout system 14. It begins at the top left, at the "start" circle. Initially, all the loadout positions (for instance the overhead loading gates 32, 34, 36 in FIG. 4) are locked out by the loading lockout system 14. Following the solid black lines, at the box 60, the computer 38 then looks for a signal from the plant's existing loadout system 22 indicating that a position has been signaled to open. In this example, let's say that the existing loadout system 22 has signaled overhead loading gate 34 to open. That is, the plant operator or the plant's loadout system has requested that the overhead loading gate 34 be opened to initiate a loadout procedure. If a signal is detected by the computer 38, then the reticle 40 is moved to the selected position (in this example targeting the loadout space beneath the overhead loading gate 34), and an image is grabbed by the camera 19 and transmitted to the computer 38 (see also FIG. 6).

The computer 38 then makes a determination (prediction) of the location of the cab 16 to determine if the cab 16 of the truck 10 is in a satisfactory position relative to the loadout space (outside of the discharge footprint) to prevent material from falling onto the cab 16. If the cab 16 is in an acceptable position, outside of the discharge footprint, then, following the dotted black line 46 to the right of the action box 48, the computer 38 sends a signal through the computer I/O breakout board 50 to energize the normally-open "protection" relay 52 to close it. (Both the protection relay and the permissive relay must be energized in order for the loading gate to open.) This is called a protective relay, because it is designed to protect the cab 16 of the truck 10 from being pummeled with material dumped from the storage silo 28. (Of course, as mentioned earlier, other protective conditions also may need to be met before the protection relay is energized. For example, the system may be programmed to determine that no hard hats, people, or inappropriate equipment is in the designated area, there is no tarp over the truck bed, the tailgate is not open, etc.)

Going back to action box 48 and going down the flow chart from there, the computer 38 analyzes the predictions to determine if it is safe to load the truck bed. In other words, a decision is made as to whether the open truck bed 18 or other receiving opening is properly located in the loadout area beneath the targeted overhead loading gate 34 (i.e. whether the discharge footprint of the loading gate 34 is within the receiving opening of the vessel). Follow the dotted line 56 to the right of the action box 54, indicating that the action is taken for the computer 38 to send a signal through the I/O board 50 to permit the selected overhead loading gate 34 to be energized to open. The signal closes the "permissive" relay 58 to close the circuit, allowing the dump gate 2 in FIG. 6 (in this example the dump gate 2 is the same as the overhead loading gate 34) to be opened to carry out the loadout sequence.

To finish the flow chart, going back to the second action box 60 from the start position, the computer 38 looks for a signal from the plant's loadout system 22 indicating that a position has been signaled (targeted) to open. Following the dotted line 61, the computer 38 reads the electrical inputs from the loadout system 22, and if any such input has been energized (in this case the input that has been energized is the input to open the overhead loading gate 34), then the index is set to that of the energized input (that is, gate 34) and the reticle 40 is moved to the set index position.

If any of the required conditions are not satisfied, all positions remain locked such that opening of any overhead loading gate 32, 34, 36 is a no go.

Figure 6:
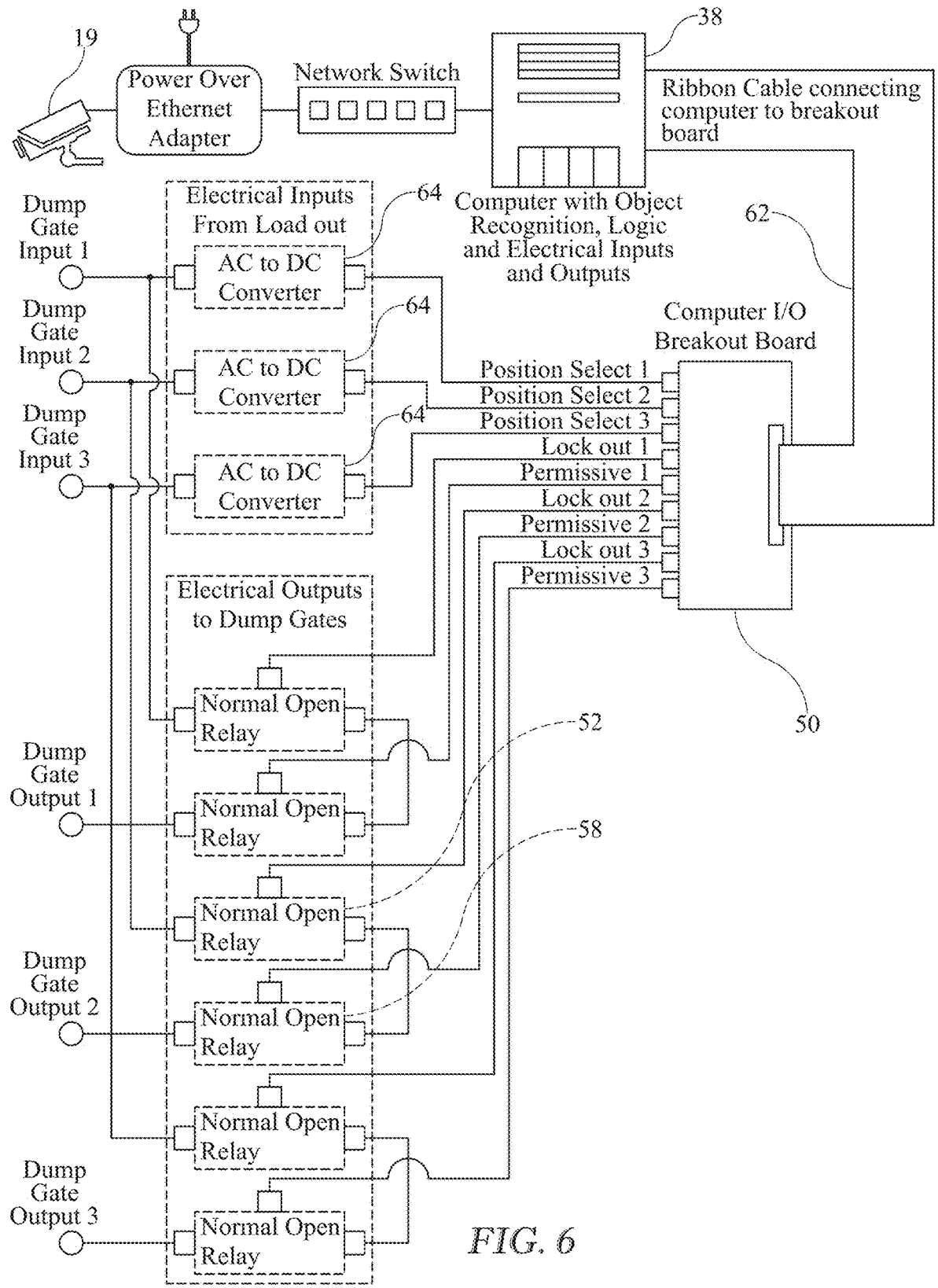
FIG. 6 is a schematic electrical block diagram of the first embodiment of the loading lockout system.

Referring now to FIG. 6, the camera 19 sends an image of the selected index (the selected energized position by the loadout system 22, i.e. loading gate 34) to the computer 38, which applies the algorithm to determine whether the cab 16 is in an acceptable position outside of the discharge footprint. If so, it sends a signal via the ribbon cable 62 through the I/O board 50, to energize the protective relay 52, as discussed earlier.

Likewise, the computer 38 applies the algorithm to determine whether the open bed 18 is in an acceptable position, with the loadout area (i.e. the discharge footprint) properly between the vertical decision lines (i.e. inside the receiving opening) indicating the safe loading area for the truck bed. If so, it sends a signal via the ribbon cable 62 through the I/O board 50 to energize the permissive relay 58, as discussed earlier. With both the protective relay 52 and the permissive relay 58 energized, the circuit is closed. The signal from the loadout system 22 to open the overhead loading gate 34 (again, in this example this is the same as the dump gate 2) has been intercepted by the loading system 14, the parameters have been analyzed and deemed satisfactorily met (by the energizing of the protective relay 52 and of the permissive relay 58), and the signal is then allowed to go on to the dump gate 2 to open the overhead loading gate 34.

Looking at the electrical block diagram of FIG. 6, on the top left are the dump gate inputs 1, 2, and 3 (these correspond to overhead loading gates 32, 34, and 36 respectively in this example). These dump gate inputs are coming from the plant's loadout system 22. They are converted from AC to DC power in the converters 64 and are fed as inputs to the I/O board 50 and transmitted, via the ribbon cable 62, to the computer 38. This is when the action takes place in action box 60 of the flow chart of FIG. 5.

In this instance, the signal to open the overhead loading gate 34 (the same as the dump gate 2) has been received from the existing loadout system 22, converted to a DC signal and fed to the I/O board 50 which in turn signals the computer 38 to have the camera grab an image and set the reticle 40 on the position corresponding to the overhead loading gate 34. The camera grabs the image and sends it back to the computer 38, which applies the algorithm to ascertain if the position of the truck 10 is acceptable from the point of view of protecting the cab 16 (if so, send the signal to the I/O board 50 to energize the protective relay 52) and from the point of view of loading out the material into the bed 18 of the truck 10 (if so, send the signal to the I/O board 50 to energize the permissive relay 58). Once both relays 52, 58 are energized, the circuit is closed, and the signal can proceed to the dump gate output 2 to physically open up the overhead loading gate 34 and carry out the loadout sequence.

In actual practice, the process appears seamless and practically instantaneous from the point of view of the operator. All the checks, decisions, and energizing (or non-energizing) of the relays occur in an instant.

Figure 7A:
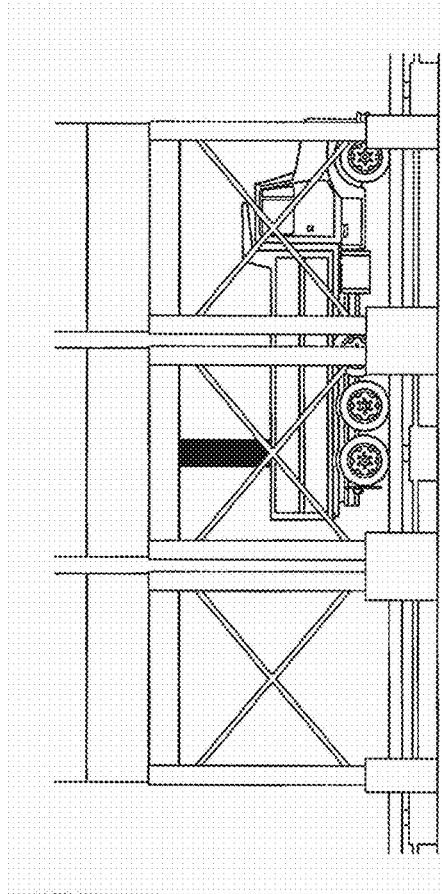
FIGS. 7A-7C are a set of schematic representations illustrating a progressive loading of a receiving truck indicating the gravity discharge of the material, e.g., hotmix, as it is discharged into the truck in accordance with the loading system.
Figure 7B:
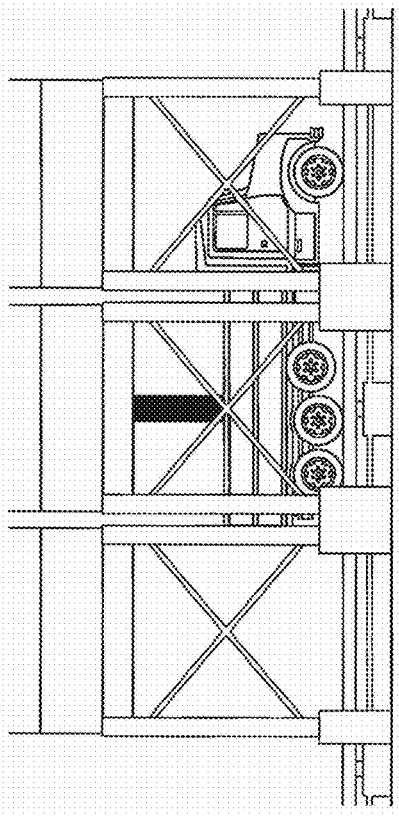
Figure 7C:
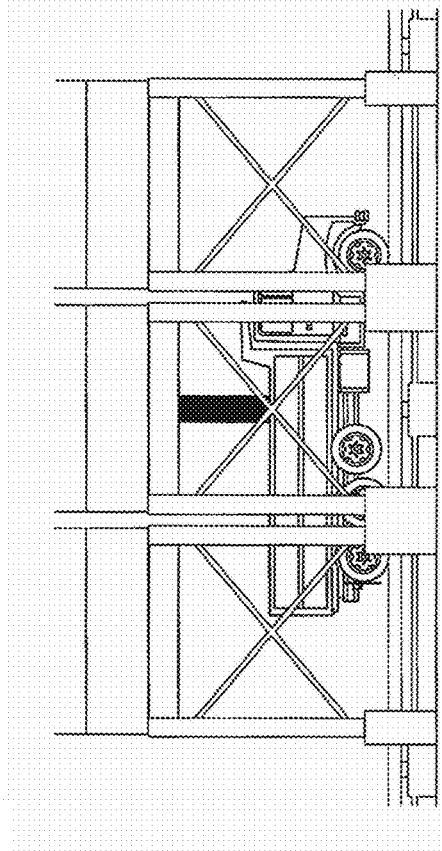

FIGS. 7A-7C are a set of schematic representations illustrating a progressive loading of a receiving truck indicating the gravity discharge of the material, e.g., hotmix, as it is discharged into the truck in connection with the operations and systems and methods described herein. As shown in FIG. 7A, the truck is first loaded near the front of the bed, then is loaded near the rear of the bed FIG. 7B, then is loaded near the middle of the bed FIG. 7C.

FIGS. 8A-8C are a set of schematic representations illustrating a progressive loading of a receiving truck with arrows indicating the gravity discharge of the material, e.g., hotmix, as it would be seen discharging into the truck in connection with the operations and systems and methods described herein. In this embodiment, it is loaded first near the front of the bed, as shown in FIG. 8A, then near the center of the bed, as shown in FIG. 8B, then near the rear of the bed, as shown in FIG. 8C.

FIGS. 9 and 10 show another embodiment of a loading lockout system 68, which is particularly useful when the loading area is in a confined space. For example, some states or cities have a requirement for a blue smoke recovery system, wherein the standard loadout system is substantially enclosed inside a tunnel 66, such that the first embodiment of a Load Lockout system 14 described above may be unable to recognize/identify and measure the truck. In this embodiment 68, the system grabs an image of the truck and determines the measurements of the truck before it goes under the scales (and into the tunnel 68 used for recovering the blue smoke). We will refer to this measurement of the truck as a measured dimension. Another measurement is taken from a distance-measuring device to the front of the truck to determine the position of the front of the truck. (The system is calibrated to know the position of the distance measuring device relative to the discharge footprints of the silos.) The system then uses the measured dimensions of the truck relative to the position of the front of the truck to calculate whether the cab of the truck is under the selected silo (per the computer calculations). Once the computer determines that the cab of the truck is outside of the discharge footprint of the selected silo, the computer activates the protective relay. Similarly, once the computer calculation determines that the bed of the truck is properly under the selected silo (i.e. that the discharge footprint of the selected silo is within the open bed), it activates the permissive signal so that the loadout sequence may proceed. The activation of the protective relay and the permissive relay operate as discussed with respect to the first embodiment, such that both the protective relay and the permissive relay must be activated in order for the loading gate to open.

Referring to the plan, schematic view of FIG. 9, a blue-smoke recovery tunnel 66 substantially encloses three loadout silos S1, S2, and S3. Of course, there may be more or fewer loadout silos in the tunnel 66. Note that only one loadout silo S1 is shown in FIG. 10 for the sake of simplicity.

In this embodiment, a LiDAR (Light Detection and Ranging) system 70 is used to measure distances to an accuracy of 1 cm. in 100 meters. (Other non-contact measuring systems could be used instead, if desired.) In this embodiment, the LiDAR system 70 is located in a fixed position downstream of (or in front of) the downstream or front end 67 of the tunnel 66. The dotted line LF depicts the front end of the loadout area (the front end of the discharge footprint), and the dotted line LR depicts the rear end of the loadout area (the rear end of the discharge footprint). As part of the system set-up, the LiDAR system 70 measures and stores the distances from its fixed location to the upstream (rear) LR and downstream (front) LF positions of the loadout area of the silo (where material will fall when that silo's gate is opened). If there is more than one silo in the tunnel 66, then other such distances also are measured and stored (LR2, LF2, LR3, LF3, etc.).

Note that the above LF and LR distances are "fixed" for a particular system and will not change unless the location of the LiDAR unit 70 or the location of the silo S1 is changed. Otherwise, once "calibrated" to these distances, they will not change and are used for all future calculations. The measurements LF, LR define the discharge footprint of the loadout area of the silo S1.

As shown in FIG. 9, as a truck 72 approaches the loadout lockout system 68, the LiDar system 70 takes an initial measurement L1 to confirm the presence of the truck 72 approaching the entrance or rear end 65 of the tunnel 66 and sends a signal to the computer (not shown) to instruct a side camera 74 to take one or more photographs of the truck 72 as the truck 72 is approaching the rear end 65 of the tunnel 66. In this embodiment, the camera 74 takes a series of photographs (for instance, taking photos at a rate of 30 frames per second over a time period of one second) of the truck 72 and sends them to the computer to average out the photos.

The computer uses the image of the truck 72, as described earlier, to identify the truck. The computer also determines the length of the cab 76 and the length of the bed 78 of the truck 72 and the distances from the front of the truck to the front and rear of the cab and from the front of the truck to the front and rear of the open truck bed. This determination may be made by correlating the number of pixels in the averaged photo to a known number of pixels per unit length. (Other known measurement systems may be used in addition to or instead of what has been described.) Based on these measurements and the measurement from the LiDAR system 70 to the front of the truck 72, the system calculates the location of the front and rear of the cab and of the front and rear of the truck bed relative to the LiDAR device 70 and relative to the silos.

The measured distance from the LiDAR 70 location to the front of the truck when the truck is approaching the tunnel 66 is shown in FIG. 9 as L1. The computer uses this distance L1 and adds to it the respective pre-measured distances from the front of the truck to the front of the cab CF, from the front of the truck to the rear of the cab CR, from the front of the truck to the front of the bed BF, and from the front of the truck to the rear of the bed BR to determine the respective positions of those respective parts of the truck.

The truck 72 then proceeds to enter the tunnel 66. When the truck 72 is stopped under the correct loading silo (in this instance S1), the computer takes a new LiDAR measurement L2 to the front of the truck (See FIG. 10), and the computer uses that measurement to calculate the new positions for the front and rear of the cab and the front and rear of the bed relative to the loadout area.

As indicated earlier, the computer already has stored the actual loadout area (discharge footprint) of the silo relative to the LiDar unit 70 which determines the maximum forward position (LF) for where the material can possibly fall as it exits the silo S1, as well as a maximum rearward position (LR) for where the material can possibly fall as it exits the silo S1.

The computer then compares the positions of the front and rear of the cab to the discharge footprint of the silo and compares the positions of the front and rear of the truck bed to the discharge footprint of the silo to ensure that the cab is outside the discharge footprint of the silo S1, so that the cab 76 is indeed in a safe location. If that condition is met, the computer energizes a protective relay for that overhead loading gate (Silo S1) as described earlier with respect to the first embodiment. Also, as described earlier, the computer may be programmed to check to ensure that no other improper items are within the discharge footprint before energizing the protective relay. In order for the existing loadout system to be able to open the loading gate, both a protective relay and a second relay, referred to here as the permissive relay, must be activated.

The computer then uses the known position of the unloading area (the discharge footprint) and the calculated positions of the front and rear of the open truck bed (the receiving opening) to determine whether the discharge footprint is within the receiving opening of the truck bed. If that condition is met, the computer energizes a permissive relay for that overhead loading gate.

Since both the protective relay and the permissive relay are now activated, the loadout system proceeds with the loadout sequence and opens the silo gate to release the material into the bed 78 of the truck 72.

FIGS. 11-16 show another embodiment of a loading lockout system 68', which may be used in a wide variety of environments, including in an open structure silo, in a confined or semi-confined loading area such as in a blue-smoke recovery tunnel system, and in various other loading environments. This embodiment is being shown as being used in a confined tunnel system having three material storage devices or silos, but it is applicable to a wide variety of loading arrangements.

FIG. 11 is a plan view of a loading lockout system 68' including a tunnel 66 having three material storage devices (in this case silos), with each material storage device having a discharge footprint represented by the small dotted lines DF1, DF2, DF3, respectively, which is the area directly below the loading gate through which material falls when the loading gate is opened. The field of view of the camera is represented by the large dotted lines FV1, FV2, FV3. In this embodiment, three material storage devices are shown. A vessel 72 (in this instance the vessel is a truck) includes a cab 76 and an open bed 78. The open bed 78 defines a receiving opening through which the material falls into the vessel.

The cab 76 is defined to be an improper item that should not be within the discharge footprint DF when the loading gate is opened. The computer or processor-based system may be trained to recognize the cab 76 (as noted above) or other portion of the vessel 72 that should not be within the discharge footprint DF when the gate is opened as being improper items. Other improper items that the system might be trained to recognize might include a hardhat, a tarp, a forklift, a skid steer, etc.

In FIG. 11, a truck 72 is preparing to enter the tunnel 66 having three material storage devices (silos), each storage device defining its own discharge footprint DF1, DF2, DF3, respectively. Proximate each discharge footprint DF1, DF2, DF3 is a camera C1, C2, C3, respectively. Each camera is disposed to take images and/or videos of an area wherein the field of view FV1, FV2, FV3 of each camera C1, C2, C3 respectively encompasses substantially the entire discharge footprint DF1, DF2, DF3, respectively. (Each camera C actually may represent one or more cameras.) Each camera C is located at an elevation above the elevation of the receiving opening of the vessel (in this case above the top of the truck bed 78) and is aimed substantially downwardly so as to look downwardly through the receiving opening into the vessel. In this case, each camera C is looking downwardly into the open truck bed 78 to view some or all of the receiving opening of the vessel 72 when the discharge footprint DF1, DF2, DF3 is within the receiving opening of the vessel 72. Preferably, each camera is able to view at least one of either the near side 80 or the far side 82 of the truck bed 78 when the discharge footprint DF of the corresponding material storage device is within the receiving opening of the truck bed 78.

The system is trained to recognize the truck bed 78 as the truck 72 drives into the loading area and determines when the respective discharge footprint DF1, DF2, or DF3 is within the receiving area of the truck bed 78. The system recognizes the front edge 81, rear edge 83, and left and right edges 80, 82 of the top of the truck bed 78 and knows when the discharge footprint DF is within the receiving area of the truck bed 78 even when only the left and right edges 80, 82 of the truck bed 78 are within the field of view of the camera C.

One possible camera C to use for this application is available from and sold by Axis Communications (e.g., P14 Series). For example, the camera may feature five megapixels (5 MP) image quality, operate using Lightfinder 2.0 and Forensic WDR (Wide Dynamic Range technology), and include a deep learning processing unit (DLPU) with powerful analytics for detection of humans, vehicles, types of vehicles, and/or sections or portions of vehicles and/or for differentiation of such objects or features and for processing and storing collected data. For example, the camera takes images in IR (Infrared spectrum) for high image quality in a wide array of light conditions, even in hazy conditions, and may have wireless connectivity with built-in features. The camera may include an "OptimizedIR"-type capability to enhance the IR beam and field of view illumination.

The camera C can be installed using any one of a number of methods, including gluing, welding, screwing, bolting, and magnetic attraction to any ferrous material such as structural frames or braces, e.g., using rare-earth magnets. In this embodiment, magnetic attraction to the supporting structure of the silo is used to mount the camera. Although thermal imaging cameras may be used for detection to complement the safety lockout system, visual day-and-night cameras with IR illumination provide greater recognition capabilities and is particularly suitable for video analytics. It is also contemplated within the applications of the current system that artificial IR illumination may be supplied by standalone IR illuminators or be integrated into the camera. The camera may also include flexible illumination angle capability to allow remote-zoom or custom zoom to address changing conditions or to permit a change in location of the camera. The angle of illumination may adapt to the zoom level. The camera may include IR LEDs to provide an illumination angle that follows the zoom movements. The camera may also provide pan-tilt-zoom (PTZ) capability to optimally adjust illumination for the field of view and zoom when panning, tilting, or zooming. In this manner the IR illumination beam adapts to the camera view.

The magnetic and wireless installation capability allows quick and simple mounting of the cameras to the existing silo structure as well as ease of relocation of the cameras as required. It should be noted that the cameras C may be provided with additional useful features, found either within the camera described above or added by the installation of additional hardware.

These features may include contactless distance measurement capability, such as LiDAR capability, to recognize the distance from the camera to the bottom of the open truck bed. So, for example, if a tarp or cover has not been removed from the top of the truck bed 78, causing the distance to be too short, this feature can alert the system to prevent the loadout sequence from proceeding. Also, as the material is being discharged from the material storage device and into the truck bed 78, the LiDAR system can monitor the level of the material in the bed of the vessel 72 to alert the system when the material reaches a desired elevation.

Another feature which may be included is a temperature sensor, adding the capability of reading the temperature of the material being discharged from the material storage device into the vessel 72.

Referring to FIG. 12, the truck 72 is entering the tunnel 66, and the camera C1 is able to view and recognize the cab 76 within its field of view FV1. The system 68' recognizes that the cab 76 is an improper item within the discharge footprint DF1, and so will not actuate the protective relay described earlier. This means that the system 68' will not allow the loading gate to open when the cab 76 is under the loading gate or within the discharge footprint DF1.

Referring to FIG. 13, the truck 72 has entered the tunnel 66 a bit further. The camera C1 recognizes the open truck bed 78 (the receiving opening of the truck 72) and determines that the discharge footprint DF1 of the first silo is within the receiving opening 78 of the truck 72. It also recognizes that at least a portion of the cab 76 is still within the field of view FV1 of the camera C1 but is outside of the discharge footprint DF1. Since the discharge footprint DF1 is entirely within a receiving opening of the vessel 72, and no portion of the cab (improper item) 76 is within the discharge footprint DF1, the loading lockout system 68' permits the loadout sequence to proceed, activating both the protective relay (since there are no improper items within the discharge footprint DF1) and the permissive relay (since the discharge footprint DF1 is entirely within the receiving opening 78 of the vessel 72).

Referring to FIG. 14, the cab 76 and the front edge 81 of the truck bed 78 have moved beyond the field of view FV1 of the camera C1, and the rear edge 83 of the truck bed 78 has not yet moved into the field of view FV1. The left and right edges 80, 82 of the truck bed 78 are within the field of view FV1. In this situation, the system still recognizes that the discharge footprint DF1 is entirely within the receiving opening of the vessel 72. It also recognizes that there are no improper items within the discharge footprint DF1, so it permits the loadout sequence to proceed.

The operation of this loading lockout system 68' is as shown in FIGS. 5 and 6. Namely, a camera takes one or more images and/or video of a vessel 72 (such as a truck) which may have a cab 76 and a bed 78 (or material receiving opening), sends these images to a computer or processor-based system adapted to analyze the images and, based on a training set of data and through a process using artificial intelligence (AI) and including image recognition technology and algorithms, the system recognizes the receiving opening 78 of the vessel 72. The system 68' also determines when the discharge footprint DF is within the receiving opening 78 of the vessel 72 and ensures that is the case before allowing the loading sequence to proceed.

The system also checks to ensure that no improper items, such as the cab of a truck, are within the discharge footprint DF before permitting the loading sequence to proceed.

It should be noted that the images used to train the system for this embodiment are substantially top views of trucks or other types of vessels anticipated to be used as opposed to substantially side views as in the previous embodiments. The system may be updated periodically by using images of additional types of vessels to further train the system. For example, if it is found that the system does not recognize the receiving opening of a particular type of vessel, the operator may override the lockout system by using an override key. In that case, the override condition is logged, images are stored, and these images may be used for additional training of the system.

As described above, the loading lockout system sees and recognizes the presence of the cab 76 as it passes in front of the camera. It then recognizes the receiving opening 78 that follows after it has seen the cab 76, even if it can no longer detect the cab 76 within its field of view FV.

Once it establishes that there are no improper items (based again on a training set of data and through a process using artificial intelligence (AI) and including image recognition technology and algorithms) within the discharge footprint DF1, a protective relay is actuated. Once it has established that the discharge footprint DF is within the receiving opening 78 of the vessel 72, it actuates a permissive relay. When these two conditions have been met, the loading lockout system 68' allows the loadout sequence to proceed.

As mentioned above, in certain instances, it may be advantageous to allow the operator to bypass the loading lockout system 68'. A key, or a button, or a computer command (or other mechanism, not shown) may be used to allow the operator to bypass or override the loading lockout system, and the override event is logged, including live images for future reference.

FIGS. 15 and 16 show an embodiment of the loading lockout system 68' of FIGS. 12-14 but with an added feature of side cameras SC1, SC2, and SC3, which provide a side view of the vessel 72 as the loading sequence is proceeding.

FIG. 15 shows the three cameras SC1, SC2, and SC3 aimed substantially horizontally at their corresponding loading areas. These cameras are not looking down into the receiving opening of the vessel 72, but they are able to provide a visual confirmation of the loadout sequence, which may be helpful to the operator. They also may provide documentation of information, such as the specific identity of the vessel, and even an image of the driver, which may be helpful for customers whose vessels are being loaded.

FIG. 16 is an image of a screen display that may be provided to the plant operator (and/or recorded for future reference as required). It shows what the overhead cameras C1, C2, C3 see, showing the field of view of the camera FV1, FV2, FV3, and the discharge footprint DF1, DF2, DF3 respectively and, in this instance, showing also both the near wall 80 and the far wall 82 of the bed 78 of the vessel 72. FIG. 16 also includes an inset image 86 on the bottom right hand corner of the screen image 84, showing a side view of the vessel 72 as it is being loaded.

In addition, the loading lockout system alone or in connection with the existing loadout system may be configured to identify a vessel, e.g., truck having an RFID tag, license plate, or other detectable indicia, based on a database storing records associated with the vessel or a carrier or owner of the vessel or a contract or permit or license associated with the vessel. The loading lockout system may prevent release of materials from the material storage device in the absence of determining the vessel is on record as having a purchase order, established credit, a credit card or other payment means on file, or other approval to receive materials from the material storage device before loading. In this manner, the loading lockout system can also assist in preventing theft and in prompting a vessel operator to provide payment or confirmation of payment prior to loading the vessel.

While the above description provides the details of several different embodiments of a loading lockout system, it will be obvious to those skilled in the art that modifications may be made to the embodiments described above without departing from the scope of the invention as claimed.

What is claimed is:

1. A method for determining the position of a vessel for loading from a material storage device defining a discharge footprint, the method comprising:
   by one or more cameras, taking or retrieving one or more images or videos of a vessel or a portion of a vessel;
   sending or providing the one or more images or videos to a computer or processor-based system adapted or configured to analyze the one or more images or videos based on a training set of data and set of algorithms to recognize a receiving opening of the vessel;
   preventing the discharge of material from the material storage device until determining that the discharge footprint is within the receiving opening of the vessel;
   predefining one or more improper items that should not be within the discharge footprint during loading;
   determining whether any of the predefined one or more improper items are within the discharge footprint;
   determining when the discharge footprint is within the receiving opening of the vessel so that material will fall properly into the vessel through the receiving opening when it is discharged from the material storage device; and
   preventing the discharge of material from the material storage device until determining that none of the predefined one or more improper items are within the discharge footprint.

2. The method of claim 1, wherein the step of determining whether any of the predefined one or more improper items are within the discharge footprint includes:
   by a camera, taking or retrieving one or more images or videos of the discharge footprint;
   sending or providing the one or more images or videos to a computer or processor-based system adapted or configured to analyze the one or more images or videos based on a training set of data and set of algorithms to recognize one or more improper items; and determining whether any of the one or more improper items are located within the discharge footprint.

3. The method of claim 1, wherein the step of determining whether any of the predefined one or more improper items are within the discharge footprint includes analyzing the one or more images or videos of the vessel or portion of the vessel based on a training set of data and set of algorithms to recognize a portion of the vessel that is a predefined improper item.

4. The method of claim 3, and further comprising analyzing the one or more images or videos of the vessel or portion of the vessel to measure a set of dimensions of the vessel or of a portion of the vessel.

5. The method of claim 4, wherein the step of determining whether any of the predefined one or more improper items are within the discharge footprint includes using a contactless distance measuring system, such as LiDAR (Light Detection And Ranging) to determine the position of the receiving opening of the vessel relative to the discharge footprint.

6. The method of claim 1, wherein the camera is located at an elevated position and including the step of viewing downwardly into the receiving opening of the vessel.

7. The method of claim 6, further including the step of using a contactless measuring system to measure the depth of the receiving opening of the vessel, transmitting the depth measurement to the computer or processor, and locking out the loading procedure when the depth of the receiving opening of the vessel is equal to or less than a predetermined minimum depth.

8. The method of claim 6, further including the step of measuring the temperature of the material being loaded into the vessel, transmitting the temperature measurement to the computer or processor, and recording the temperature measurement.

9. The method of claim 7, and including the step of measuring the temperature of the material being loaded into the vessel, transmitting the temperature measurement to the computer or processor, and recording the temperature measurement.

10. A loading lockout system for loading a vessel with material from a material storage device defining a discharge footprint, comprising:
   an image capturing system for capturing one or more images or videos of a vessel or portion of a vessel to be loaded;
   one or more processors operatively connected with a memory and adapted to: recognize and determine the position of a receiving opening of the vessel relative to the discharge footprint; and allow the passage of a signal permitting the loading of the vessel only upon determining that the discharge footprint is within the receiving opening of the vessel; and
   wherein said one or more processors are further adapted to recognize one or more predefined improper items and allow the passage of a signal permitting the loading of the vessel only upon determining that none of the one or more predefined improper items are within the discharge footprint.

11. The system of claim 10, wherein said image capturing system is at an elevated position and is adapted to look downwardly into the receiving opening of the vessel.

12. The system of claim 11 further comprising a temperature sensor adapted to sense the temperature of material being loaded into the vessel and transmit a signal representing the temperature measurement to the processor.

13. The system of claim 12 further comprising a contactless distance measurement system adapted to measure the depth of the receiving opening of the vessel and transmit the depth measurement to the processor.

\* \* \* \* \*